United States Patent [19]

Landrum, Jr.

[11] 3,761,874

[45] Sept. 25, 1973

[54] AUTOMATIC PRESETTING OF VIBRATOR PHASE-LOCK CIRCUITS

[75] Inventor: Ralph A. Landrum, Jr., Tulsa, Okla.

[73] Assignee: Amoco Production Company, Tulsa, Okla.

[22] Filed: June 26, 1972

[21] Appl. No.: 266,186

[52] U.S. Cl..................... 340/17, 73/71.6, 329/122, 323/106, 331/25
[51] Int. Cl............................................. G01v 1/16
[58] Field of Search ...................... 340/17, 15.5 TA, 340/15.5 TD; 181/.5 EC, .5 H; 73/71.6, 71.5; 323/101, 106; 329/122; 331/25, 23

[56] References Cited
UNITED STATES PATENTS

| | | | |
|---|---|---|---|
| 3,684,976 | 8/1972 | Terreault | 331/25 |
| 3,461,392 | 8/1969 | Hugnes et al. | 329/122 |
| 3,201,039 | 10/1972 | Lang et al. | 331/25 |
| 3,614,648 | 10/1971 | Byrne | 331/23 |
| 3,219,971 | 11/1965 | Cole | 340/15.5 TA |
| 3,698,508 | 10/1972 | Landrum, Jr. | 181/.5 EC X |

*Primary Examiner*—Benjamin A. Borchelt
*Assistant Examiner*—J. V. Doramus
*Attorney*—Paul F. Hawley et al.

[57] ABSTRACT

In seismic geophysical surveying using one or more servo-controlled vibrators as the source of varying-frequency wave energy, phase-locking of the vibrator output to the input pilot wave form is essential to the proper compositing of both sequentially received waves and simultaneous inputs by two or more vibrators. By the present invention, the phase lock-in time during which non-coherent signals may be produced is minimized by automatically sampling the phase and the gain errors shortly following each signal initiation, and using the samples to update the preset values for each subsequent signal generation.

5 Claims, 1 Drawing Figure

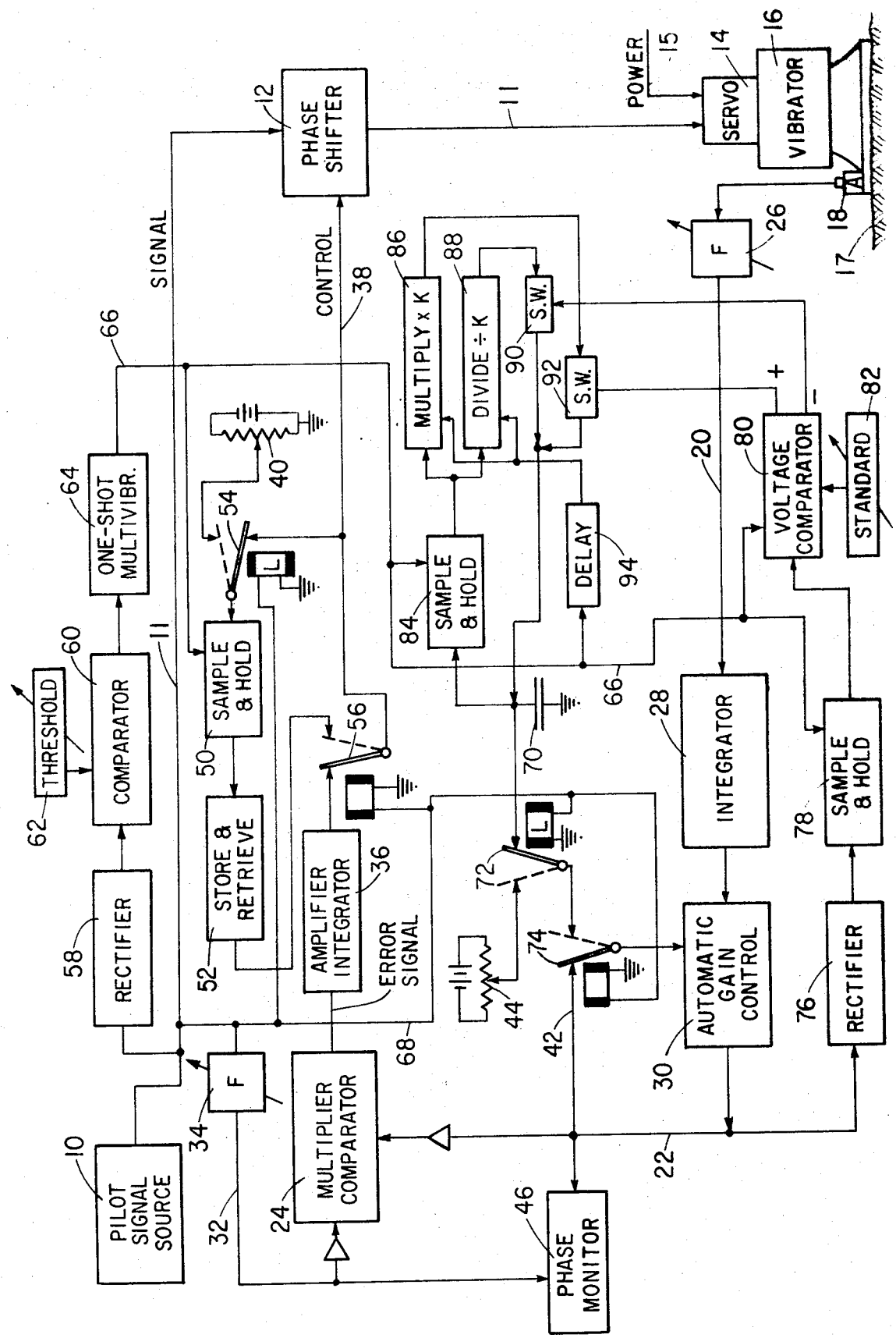

3,761,874

AUTOMATIC PRESETTING OF VIBRATOR PHASE-LOCK CIRCUITS

FIELD OF THE INVENTION

This invention relates to seismic geophysical surveying as in the exploration for minerals such as oil and gas and is directed particularly to seismic surveying using one or more servo-controlled vibrators as the source of seismic-wave energy. More specifically, the invention is directed to vibratory seismic surveying using servo-controlled vibrators wherein there is provided a pilot signal having a desired wave form of a number of cycles duration and typically of varying frequency, and phase-lock circuitry is employed to cause the vibrator or vibrators to follow and remain in step with the pilot signal while generating a corresponding seismic signal in the ground. Specifically, the invention is concerned with minimizing the time interval following the initiation of the pilot signal during which the vibrator control system is bringing the vibrator into a phase-locked condition.

DESCRIPTION OF THE PRIOR ART

The need for phase-locking in vibratory seismic surveying arises from the necessity that sequential energy transmissions must always be as nearly identical as possible for the compositing of the received waves to combat random noise. It is likewise essential in the use of two or more vibrators simultaneously, as the equivalent of compositing occurs during energy transmission through the earth. The effect as regards desired signals is additive like that of a single large source, while interference waves are reduced by destructive mutual interference occurring between the input signals introduced by the different vibrators. Complicating factors arise both in the fact that, over an extended frequency range, the phase of the pilot signal must be varied over a considerable range to keep the vibrator output in phase with the input pilot signal, and in the further fact that the vibrator output and its phase relation may vary considerably from place to place due to varying coupling and ground-surface conditions.

To a considerable degree, the problem of phase-locking the vibrator output to the pilot signal input has been solved in the manner described in U. S. Pat. No. 3,219,971 of J. R. Cole. In that patent, a feedback signal from the vibrator output is compared with the reference signal input in a multiplier circuit, the output of which becomes an error signal which is integrated and amplified sufficiently to actuate an electronic phase-shifting circuit through which the pilot or reference signal passes in being transmitted from its source to the vibrator input. This circuit functions satisfactorily as long as ground coupling and surface conditions remain relatively constant and provided the vibrator operator manually adjusts or presets the initial phase shift and gain for the system with sufficient accuracy.

If the preset conditions are sufficiently close to those appropriate for the specific ground-surface conditions at the vibrator baseplate, then the system quite rapidly becomes phase-locked to the reference or pilot signal and remains so during the remainder of the varying-frequency wave input. On the other hand, if the preset values are not appropriate for the particular vibrator location, some appreciable portion of the period of wave input may elapse before phase-locking occurs, during which time the waves generated by the vibrator may not be coherent as regards two vibrators operating simultaneously or as between two or more successive vibration periods.

In areas where surface conditions vary considerably, a substantial amount of operator attention, skill and experience is required to manually vary the preset values of phase shift and of feedback amplifier gain in order to achieve satisfactory phase-locking operation. Failure to establish the proper preset values may result in a considerable delay in the occurrence of phase-locking, or in extreme conditions locking may not occur at all during the period of signal input. It is accordingly a primary object of my invention to provide automatic means of presetting or adjusting the preset values of pilot signal phase shift and of automatic-gain-control initial gain so that these no longer depend upon the skill and attention of the operator, who can then concentrate on other phases of vibrator operation to assure its success. The generation of non-coherent wave energy, which reduces the over-all signal-to-noise ratio of the surveying operation, is correspondingly minimized.

SUMMARY OF THE INVENTION

The foregoing and other objects are accomplished in accordance with my invention by adding to the phase-control system of the prior art, means for sampling the phase-error signal and the gain of the feedback amplifier at a definite short time interval following initiation of each reference or pilot signal, during which the system is usually moving toward a phase-locked condition, and utilizing the samples to adjust the values of initial phase shift and amplifier gain in a direction to reduce the phase and gain preset errors for the subsequent reference or pilot signal. Based on my observation that, while ground conditions may vary considerably over an extensive surface area, there is generally only a modest degree of variation between adjacent vibration points, this automatic sampling and presetting system is able to maintain the values of preset close to their optimum.

BRIEF DESCRIPTION OF THE DRAWING

This will be better understood by reference to the accompanying drawing forming a part of this application and showing a representative, preferred embodiment of the invention in mostly block diagram form.

DETAILED DESCRIPTION OF THE DRAWING

Referring now to the drawing in detail, a pilot signal source 10 is coupled by a conductor 11 through a phase shift circuit 12 to a vibrator servo input 14 which controls the flow of power 15 from a source (not shown) to a vibrator 16 in contact with the ground surface 17. The motion of the baseplate of vibrator 16, resulting from the combination of power input 15 and reaction with the ground surface underneath, is detected by an accelerometer 18 transmitting its signal over conductors 20 and 22 to a multiplier-comparator 24 which is the source of the error signal for controlling phase shifter 12. There may be included in lead 20 a variable-pass filter 26 to remove harmonic distortion from the seismometer baseplate signals for the reasons and in the manner described in my co-pending application, Ser. No. 101,571, filed Dec. 28, 1970, entitled "Phase Control of Servo-Hydraulic Vibrators, now U.S. Pat. No. 3,698,508."

The output of accelerometer 18 is integrated by an integrator 28 to convert it to a velocity-type signal corresponding to the type of signal detected in the usual seismic recording system, the output of integrator 28 passing through an automatic-gain-control (AGC) amplifier 30 which functions to raise it to a substantially constant level and thereby reduce the effect of amplitude variations on multiplier-comparator 24. While multiplier 24 is not unduly sensitive to amplitude variations, it may nevertheless be adversely affected if there is in the output of accelerometer 18 large harmonic distortion which is not effectively removed by filter 26.

The other input to multiplier 24 is taken via a lead 32 from output lead 11 of signal source 10, there preferably being included also in lead 32 a filter 34 corresponding to filter 26 in lead 20. Although filter 34 is not ordinarily required to remove harmonic distortion from the pilot signal, its presence does compensate for any time delay in filter 26 by adding a similar delay to the signal on lead 32. The error-signal output of multiplier 24, after amplification and integration by an amplifying integrator 36, is transmitted via lead 38 as the phase control signal to phase shifter 12.

The system thus far described corresponds substantially to the prior-art system shown in the Cole patent mentioned above. As, in the absence of a pilot signal, no valid phase-adjusting error signal is present on the output of multiplier 24, an adjustable phase-presetting voltage from a suitable source, such as a potentiometer 40 energized by a battery, is applied to the control lead 38 until a valid error signal occurs at the output of multiplier 24, which signal then takes over control. Similarly, by a lead 42 gain-control voltage is fed back from the output of AGC amplifier 30 to control its gain, a similar presetting voltage source comprising a potentiometer 44 being provided to establish a bias setting the initial gain of amplifier 30.

In the prior-art systems, it is necessary for the vibrator operator to initially adjust preset voltages 40 and 44 as closely as possible to proper values, as well as to readjust these voltages whenever required by ground-surface variations. The feedback signal present on lead 22 and the reference signal present on lead 32 are also typically applied to a phase monitor device 46 which produces for the vibrator operator visible indications of the phase relations in the system, as to whether or not locking has occurred.

The system thus far described operates in generally the same way as in the prior art. Briefly, throughout the time duration when the reference signal is present on lead 11, the amplified and integrated error signal present on lead 38 actuates phase shifter 12 to bring about whatever phase shift of the reference signal is necessary to make the feedback signal from accelerometer 18 on leads 20, 22 hold a substantially constant phase relationship to the reference signal present on lead 32. Whether or not this relation is established promptly after the beginning of the reference signal depends to a considerable degree on the proper presetting of voltages 40 and 44. It is the specific purpose of this invention to obviate the need for an operator to estimate and vary these voltages as ground condiitions vary beneath vibrator 16.

To this end, a sample-and-hold circuit 50 samples the phase-control voltage and actuates a store-and-retrieve circuit 52 to apply an appropriate voltage through a relay 56 to control lead 38 to establish a desired phase relation in the absence of a reference signal on lead 11. By a relay 54, sample-and-hold 50 takes its input either from control lead 38 or from potentiometer 40. The point of time at which sample-and-hold 50 takes its sample to establish the proper preset voltage for store and retrieve 52 is of some importance in that it should be very soon, typically 100 milliseconds, after the start of the pilot signal from source 10 and indicate valid difference in phase between the two input signals to comparator 24.

To determine this sampling instant, the presence of pilot signal on lead 11 is detected by a rectifier 58 supplying to a comparator 60 an increasing voltage indicating the buildup of signal in lead 11. An adjustable voltage from a threshold source 62 is also applied to comparator 60, so that when the signal-indicating voltage from rectifier 58 reaches the threshold voltage established by source 62, comparator 60 transmits a trigger pulse to a mono-stable multivibrator 64. Multivibrator 64 acts as a delay unit, transmitting after a time interval to its output lead 66 a voltage or strobe pulse that actuates the sampling action of sample-and-hold 50. The delay produced by multivibrator 64 is constant and fixed at a suitable value such as 100 milliseconds.

Turning now to the gain preset for AGC amplifier 30, in accordance with this invention, it is the voltage stored on a condenser 70 which is applied as a negative feedback to the amplifier control terminal through relays 72 and 74. The voltage of this condenser is built up or varied as necessary to meet varying gain conditions, by taking signal from the output lead 22 of amplifier 30 as the input to a rectifier 76, which supplies a DC voltage proportional to the amplifier output amplitude, which voltage is then sampled by a sample-and-hold 78. The voltage of sample-and-hold 78 is applied to a comparator 80 in which it is compared to an adjustable standard voltage from a source 82, the plus or the minus output lead of comparator 80 being energized depending on whether the sampled-and-held voltage is greater or less than the standard which represents the desired level for the output of A G C amplifier 30.

At the same time, a corresponding sample-and-hold 84 samples the voltage present on preset condenser 70 and transmits an indication of its sampled-and-held voltage to two output circuits, one a multiplying circuit 86 and the other a dividing circuit 88, where the sampled-and-held voltage is changed by a factor K or 1/K, K being a suitable constant such as 1.414, for example. Bearing in mind that the AGC is a negative feedback if the positive output lead of comparator 80 is energized, a switch 92 transmits the output voltage of multiplier 86 to condenser 70 as the new gain-reducing presetting voltage. If the negative output lead of comparator 80 is energized, the switch 90 is closed to transmit the output of divider 88 to the condenser 70 as the gain-increasing presetting voltage. Sample-and-hold 78 and 84 are actuated with the same time delay as sample-and-hold 50 by connection to lead 66 from multivibrator 64. This actuating impulse passes through a further delay unit 94, however, before actuating voltage sources 86 and 88 in order that whatever change is to be made on the voltage of condenser 70 will not occur while it is being sampled by unit 84.

The operation of these presetting circuits takes place as follows: At the start of a period of operations, relays 54, 56, 72 and 74 are in the open positions shown by dashed lines. Voltage from source 40 is present on store-and-retrieve unit 52 and is applied through relay 56 to lead 38 to serve as the initial preset control voltage, the error-signal voltage being zero. Likewise, the voltage of source 44 is applied through relays 72 and 74 to the control terminal of AGC amplifier 30. As soon as the first pilot signal from source 10 appears on lead 11, it is transmitted by lead 68 to and actuates relays 54, 56, 72 and 74. As indicated by the L, relays 54 and 72 are locking relays which upon actuation remain in their actuated position without voltage continuing to be present on lead 68. On the other hand, relays 56 and 74 are closed or open depending respectively on whether signal is present on leads 11 and 68 or is absent therefrom. Thus, during off periods, control lead 38 receives preset voltage from unit 52 through relay 56, and AGC amplifier 30 receives the controlling voltage that is present on condenser 70 through relay 74. During signal transmission, these relays close so that the error signal actuating integrator amplifier 36 supplies phase control voltage to lead 38, and the output of amplifier 30 is fed back over lead 42 to its control terminal.

Each time sample-and-hold 50 is actuated, a new value is placed in store-and-retrieve 52 which more nearly approximates the exact value required to cause phase shifter 12 to produce a minimum error signal from multiplier 24. Likewise, the preset control voltage for amplifier 30 on condenser 70 is continually being reset according to whether the output amplitude present on lead 42 matches that of standard amplitude 82 or is to be changed by the factor K or 1/K. Thus, when new values of preset are required by changes in ground-surface conditions, they are promptly and automatically supplied by these circuits without any action by the vibrator operator.

While it is preferred to estimate initial preset voltages by units 40 and 44, this is not strictly necessary as the system in a very few iterations will closely approach the proper value of phase and amplifier-gain presets needed to minimize the error signal going to lead 38. These automatically accurate presets minimize the time delay during which vibrator 16 is being brought into a phase-locked condition. While the invention has been explained with reference to a multiplier-comparator 24 as the element for determining the phase relation between the reference and the feedback signals, it will be apparent that the principle of sampling the preset errors and using the sampled values to update the preset of the control elements can also be applied in other forms of phase-control circuits.

I claim:

1. In an apparatus for generating seismic waves in seismic geophysical surveying comprising a servo-controlled vibrator, a pilot-wave source for said vibrator, a conductor including variable phase-shift means connecting said source to said vibrator, and feedback means responsive to the outputs of said source and of said vibrator, including error-signal producing means responsive to the instantaneous phase relation between said pilot wave and said vibrator output and actuating said phase-shift means to shift the phase of said pilot waves to maintain said outputs substantially in a phase-locked condition, the improvement comprising means for sampling the output of said error-signal producing means a fixed time interval after the start of each pilot signal, and means responsive to said sampling means for producing for each subsequent pilot signal an optimum proportionate value of initial error signal to minimize the time interval of attaining said phase-locked condition.

2. Apparatus as in claim 1 wherein said feedback means comprises an automatic-gain-controlled amplifier and including also means for sampling the output of said amplifier at said fixed time interval after the start of each pilot signal, and means responsive to said output-sampling means for establishing an optimum initial gain value of said amplifier for each subsequent pilot-signal generation.

3. Apparatus as in claim 2 in which said sampling means comprises means responsive to the starting of a pilot signal, and delay means triggered by said pilot-signal-responsive means for producing at the end of a predetermined time interval an output pulse which actuates said sampling means to take said samples.

4. Apparatus as in claim 3 in which said pilot-signal-responsive means comprises means for rectifying said pilot signal, and said delay means comprises a monostable multivibrator, and adjustable voltage-level-comparing means to trigger said multivibrator when the amplitude of said rectified pilot signal reaches a preset level.

5. Apparatus as in claim 2 including means to compare the output amplitude of said automatic-gain-controlled amplifier with a standard value, and means responsive to said amplitude-comparing means to increase or decrease a stored gain-presetting voltage by an adjustable factor K or 1/K.

* * * * *